J. JOHNSON.
BEARING FOR THE SHAFTS OF DELICATE INSTRUMENTS.
APPLICATION FILED AUG. 24, 1904.

923,184.

Patented June 1, 1909.

Witnesses:

Inventor,
Joseph Johnson,
By Albert S. Davis
Atty.

UNITED STATES PATENT OFFICE.

JOSEPH JOHNSON, OF LYNN, MASSACHUSETTS, ASSIGNOR TO GENERAL ELECTRIC COMPANY, A CORPORATION OF NEW YORK.

BEARING FOR THE SHAFTS OF DELICATE INSTRUMENTS.

No. 923,184.      Specification of Letters Patent.      Patented June 1, 1909.

Application filed August 24, 1904. Serial No. 221,928.

*To all whom it may concern:*

Be it known that I, JOSEPH JOHNSON, a citizen of the United States, residing at Lynn, county of Essex, State of Massachusetts, have invented certain new and useful Improvements in Bearings for the Shafts of Delicate-Instruments, of which the following is a specification.

This invention relates to bearings for the shafts of delicate instruments, such for instance as electrical measuring instruments. The shafts of instruments of this type have commonly been provided with tapered ends, and jewels have been mounted in the instrument in proper relation to support the shaft. These jewels are usually sapphires and have been commonly provided with cups or depressions which receive the ends of the shaft. In order that the shaft of the instrument may move freely, it is necessary that a certain amount of end play be allowed the shaft. On account of the extreme hardness of a sapphire it is almost impossible to cut a depression in it the sides of which taper down to a sharp point. For this reason when the parts are positioned so as to permit the required amount of end play, the shaft of the instrument is not held against lateral movement as well as is desired because of the rounded ends of the tapered depressions in the jewels.

The object of my invention is to provide jewel bearings for the shaft of a delicate instrument which shall hold the shaft against lateral movement, and at the same time permit the amount of axial movement required for easy working. I accomplish this by providing a small opening in or through one or both of the jewels from the bottom of the tapering recess or depression. This opening in the jewel can be readily made by drilling. The shaft of the instrument is provided with a tapered end the point of which extends into the opening extending through the jewel. In this way when the jewels are so positioned as to permit the necessary amount of end play the lateral movement of the shaft is negligible.

The novel features of my invention will be definitely indicated in the claims appended hereto.

The details of construction and the mode of operation of an instrument provided with my improved bearings will be better understood by reference to the following description taken in connection with the accompanying drawings which show the preferred embodiment of my invention.

Figure 1:
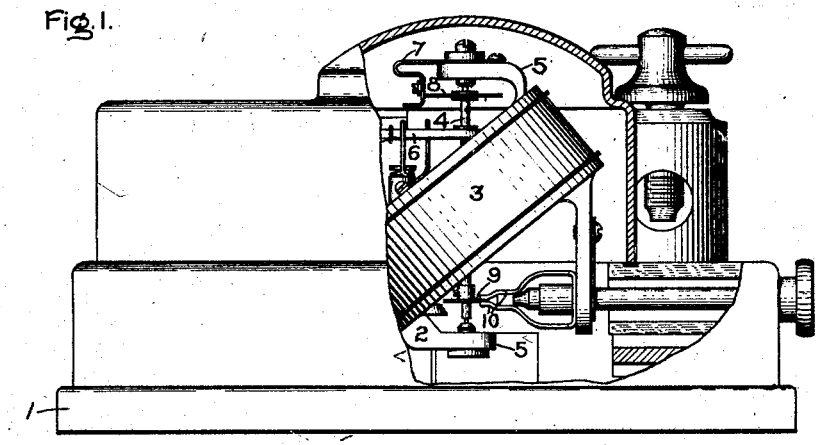
Figure 3:
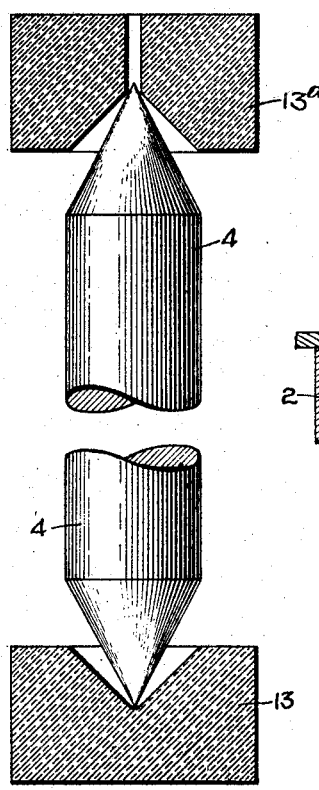
Figure 2:
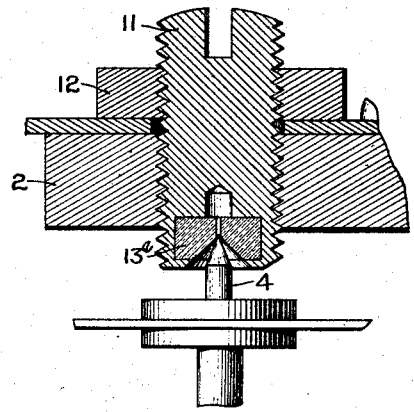

In the drawings, Figure 1 is an elevation broken away in part of an electrical measuring instrument provided with my improved bearings; Fig. 2 is an enlarged section of the upper bearing; Fig. 3 is an enlarged view showing the relation of the shaft and bearings.

In the drawings, Fig. 1 shows an electrical measuring instrument of a standard type well known to users of electrical apparatus. It is provided with a base 1 on which is supported a frame 2 which carries an actuating coil 3 inclined at an angle of about fifty degrees to the shaft 4 which is mounted in bearings carried by arms 5, 5 integral with the frame 2. Within coil 3 and mounted on the shaft 4 is a magnetic element which is acted upon by the coil to move the shaft 4 in its bearings. Shaft 4 carries an index 6 which moves back and forth over a scale mounted within the instrument under a glass plate. Secured on the upper arm 5 is a bracket 7 to which is secured one end of a light spiral spring 8, the other end of which is secured to shaft 4 so that the spring 8 furnishes the zero-seeking force for the index. On the shaft 4 is a disk 9 which is grasped by spring-clamps 10 to hold the shaft firmly and relieve the jewel bearings from the weight of the movable element when the instrument is not in use. A more detailed description of these parts of the instrument is not considered necessary as they form no part of my present invention.

In each of the arms 5—5 of frame 2 is a threaded opening in which is secured a jewel-post 11 held in place by a lock-nut 12, and seated in the end of each of the jewel-posts 11 is a jewel 13 provided with a V-shaped depression therein. The jewel 13$^a$ for the upper bearing has a small hole drilled therethrough to the bottom of the V-shaped depression as shown at the top of Fig. 3; this hole is very small, preferably less than one one-hundredth of an inch in diameter and its walls intersect the polished surfaces of the V-shaped depression at an angle different from the angle between the shaft and the bearing surface of the tapered tip of the shaft, causing the jewel to make at the edge of the small hole an annular line contact with the surface of the tapering tip of the shaft a very short distance from the end of the shaft. The jewel for the lower bearing may have a similar opening drilled therethrough if desired, though I prefer to cut in the jewel for the lower bearing a V-shaped depression tapering to as sharp a point as possible but without an opening through it. The ends of the shaft 4 of the instrument are tapered off to sharp points and the lower end rests in the bottom of the depression in the jewel forming the lower bearing block and the upper end extends a very short distance into the opening drilled through the jewel forming the upper bearing block so that the upper end of the shaft is supported a short distance below the point.

The advantage of the construction herein shown and described is obvious. In the usual type of bearing the jewels have V-shaped cups or depressions cut therein but the sides of these depressions do not extend straight down to form a sharp point at the bottom of each cup. As above pointed out, it is necessary to provide for a small amount of axial movement of the shaft of the instrument in order that it will move freely in response to slight variations of the actuating force. With the usual type of bearings, adjustment which allows this end movement permits a considerable amount of lateral movement of the shaft which is very objectionable and which not only affects the accuracy of the indications, but also renders greater clearances necessary for the moving parts thereby greatly reducing the sensitiveness of the instrument. When the upper bearing is constructed as shown in Fig. 3 and the same amount of end play is permitted as with the usual type of bearing the amount of lateral movement permitted is very small.

The construction herein shown and described is particularly useful in instruments which are designed for use with their shafts in a vertical position. In such cases I prefer to provide an opening through the jewel forming the upper bearing only. However, I do not wish to be understood as limited to any particular class of instruments or to instruments in which only one of the bearing blocks is provided with an opening therethrough. Also it is obvious that this opening in the jewel at the bottom of the cup or depression therein need not extend entirely through it as shown herein; it may extend into the jewel only far enough to clear the point of the shaft.

What I claim as new and desire to secure by Letters Patent of the United States, is,

1. In a measuring instrument, the combination with a shaft for the moving element tapered to a point at one end, of a jewel having a V-shaped depression with the sides thereof forming an angle with each other greater than the angle at the tip of the shaft and a cylindrical hole at the bottom of said depression for receiving the tip of the tapered shaft.

2. In a measuring instrument, the combination with a shaft for the moving element tapered to a point at one end, of a jewel having a polished surface and a small cylindrical hole with walls intersecting the polished surface at an angle different from the angle between the axis of the shaft and the bearing surface of the tapered tip thereof, whereby the tip of the shaft enters the hole and engages the jewel only at the line of intersection.

In witness whereof, I have hereunto set my hand this 16th day of August 1904.

JOSEPH JOHNSON.

Witnesses:
  JOHN A. McMANUS, Jr.,
  GEORGE W. BEADLE.